United States Patent
Oleson (10) Patent No.: US 9,493,242 B2
(45) Date of Patent: Nov. 15, 2016

(54) AIRCRAFT PASSENGER SEAT AND SEAT SWIVEL ASSEMBLY

(75) Inventor: Michael L. Oleson, Parkland, FL (US)

(73) Assignee: B/E Aerospace, Inc., Wellington, FL (US)

( * ) Notice: Subject to any disclaimer, the term of this patent is extended or adjusted under 35 U.S.C. 154(b) by 497 days.

(21) Appl. No.: 13/335,980

(22) Filed: Dec. 23, 2011

(65) Prior Publication Data
US 2013/0161990 A1    Jun. 27, 2013

(51) Int. Cl.
| A47C 1/00 | (2006.01) |
| B64D 11/06 | (2006.01) |
| B60N 2/06 | (2006.01) |
| B60N 2/07 | (2006.01) |
| B60N 2/14 | (2006.01) |

(52) U.S. Cl.
CPC ............ *B64D 11/064* (2014.12); *B60N 2/062* (2013.01); *B60N 2/0717* (2013.01); *B60N 2/14* (2013.01); *B60N 2/146* (2013.01); *B64D 11/06* (2013.01); *Y02T 50/46* (2013.01)

(58) Field of Classification Search
CPC ...................................... A47C 3/18
USPC ............ 297/344.21, 344.22, 344.24, 344.26
See application file for complete search history.

(56) References Cited

U.S. PATENT DOCUMENTS

| 3,622,202 | A | | 11/1971 | Brown | |
| 4,792,188 | A | * | 12/1988 | Kawashima | ............. 297/344.26 |
| 4,844,543 | A | * | 7/1989 | Ochiai | ..................... 297/344.26 |
| 5,161,765 | A | * | 11/1992 | Wilson | .................. B60N 2/062 |
| | | | | | 248/425 |
| 5,568,960 | A | * | 10/1996 | Oleson | .................. B60N 2/146 |
| | | | | | 248/418 |
| 5,720,462 | A | * | 2/1998 | Brodersen | ...................... 248/425 |
| 6,015,188 | A | * | 1/2000 | Yundt et al. | ............. 297/344.21 |
| 6,021,989 | A | * | 2/2000 | Morita et al. | .............. 248/349.1 |
| 6,557,919 | B2 | * | 5/2003 | Suga et al. | ................. 296/65.07 |
| 6,575,420 | B2 | * | 6/2003 | Yoshida et al. | ............... 248/425 |
| 6,666,514 | B2 | * | 12/2003 | Muraishi et al. | ........ 297/344.22 |
| 6,691,970 | B1 | * | 2/2004 | Sutton, Sr. | ..................... 248/425 |
| 6,722,737 | B2 | * | 4/2004 | Kanai | ...................... 297/344.22 |

(Continued)

FOREIGN PATENT DOCUMENTS

WO    2006 041570 A1    4/2006

OTHER PUBLICATIONS

International Search Report for PCT/US2012/068880 dated Mar. 20, 2013.

*Primary Examiner* — David R Dunn
*Assistant Examiner* — Alexander Harrison
(74) *Attorney, Agent, or Firm* — Shumaker, Loop & Kendrick, LLP (57) ABSTRACT

An aircraft passenger seat swivel assembly for an aircraft seating unit that includes a pair of transversely spaced-apart base rails, each including fore and aft fittings for connecting the base rails to an aircraft deck. The base rails define a transversely-extending horizontal plane extending between the pair of base rails. A swivel assembly is mounted between the pair of base rails in the laterally-extending horizontal plane. The swivel assembly provides a low profile seat with a spar that forms a part of the swivel assembly and transfers loads from the seat efficiently to the aircraft deck. A slide assembly enables the seat occupant to slide the seat fore-and-aft and side-to-side independent of the rotation of the seat on the swivel.

3 Claims, 9 Drawing Sheets

(56) References Cited

U.S. PATENT DOCUMENTS

| | | | |
|---|---|---|---|
| 2006/0108848 A1* | 5/2006 | Williamson et al. | 297/344.24 |
| 2009/0127908 A1* | 5/2009 | Kucharski et al. | 297/344.24 |
| 2009/0174246 A1* | 7/2009 | Kaip et al. | 297/344.21 |
| 2010/0102611 A1 | 4/2010 | Bunea et al. | |
| 2011/0163586 A1* | 7/2011 | Findlay | 297/344.26 |
| 2012/0235457 A1* | 9/2012 | Laurita | 297/344.21 |
| 2012/0256459 A1* | 10/2012 | Nilsson et al. | 297/344.21 |

\* cited by examiner

AIRCRAFT PASSENGER SEAT AND SEAT SWIVEL ASSEMBLY

TECHNICAL FIELD AND BACKGROUND OF THE INVENTION

The present invention relates to an aircraft passenger seat and seat swivel assembly. The seat is adapted to be mounted on the deck of an aircraft seat and permit rotations of the seat when desired, relative to the aircraft. The swivel assembly design provides swiveling capability to passenger seats without increasing the overall seat height, and is particularly useful in aircraft configurations providing limited passenger headroom. The swivel design also permits seating loads to be transferred laterally directly to the seat base rails and to the aircraft seat tracks and deck.

Many private aircraft passenger seats have comfort features such as the ability to swivel the seat from side to side and slide the seat fore and aft that are not typically found in commercial passenger aircraft. Typically, swiveling seats have a seat pan that is mounted on a swivel assembly that in turn is mounted on top of laterally-extending spars that extend transversely between a pair of base rails mounted by track fittings to tracks in the aircraft deck. These seats are specifically constructed for aircraft use in compliance with FAA-mandated safety requirements. In addition to being able to swivel smoothly and comfortably, this type of seat must also be capable of being locked into a fixed position for taxi, take-off, landing and flight turbulence, and to withstand substantial, specified impact forces.

In comparison with commercial aircraft, most general aviation aircraft have smaller fuselages with less passenger headroom. For this reason, most general aviation passenger seats sit closer to the aircraft deck to provide as much headroom as is possible to the seated passenger within the design and engineering requirements of the seat. Prior art swiveling aircraft seats provide reduced headroom for the seated passenger because the swivel is mounted on top of the seat base—usually on the base spars—and thus add to the overall height of the seat above the aircraft deck.

This type of design also applies seat loading to the spars which extend transversely between the seat base rails rather than directly to the seat base rails. This is an inefficient means of transferring seating loads to the aircraft deck.

SUMMARY OF THE INVENTION

Therefore, it is an object of the invention to provide an aircraft passenger seat swivel assembly and aircraft passenger seat that provides the same overall seating height as non-swiveling aircraft passenger seats, particularly passenger seats of the type found in general aviation aircraft.

It is a further object of the invention to provide an aircraft passenger seat swivel assembly and aircraft passenger seat that efficiently transfers seat loading directly to the base rails of the seat.

These and other objects and advantages of the present invention are achieved by providing an aircraft passenger seat swivel assembly for an aircraft seating unit that includes a pair of transversely spaced-apart base rails, each including fore and aft fittings for connecting the base rails to an aircraft deck. The base rails define a transversely-extending horizontal plane extending between the pair of base rails. A swivel assembly is mounted between the pair of base rails in the laterally-extending horizontal plane.

According to one preferred embodiment of the invention, the swivel assembly defines a transversely extending spar connected to and bridging the space between the base rails in the transversely-extending horizontal plane extending between the pair of base rails.

According to a further preferred embodiment of the invention, the swivel assembly includes a swivel plate having a generally annular recess and an exterior lock flange formed therein.

According to a further preferred embodiment of the invention, the transversely extending spar is integrally-formed with the swivel plate.

According to a further preferred embodiment of the invention, the transversely extending spar includes elongate connecting members for being positioned in complementary locking apertures formed in the base rails.

According to a further preferred embodiment of the invention, the locking apertures comprise bolt holes extending through top and bottom surfaces of the base rails and aligned with aligned bolt holes in the connecting members for receiving bolts therethrough.

According to a further preferred embodiment of the aircraft seat, the locking apertures comprise bolt holes extending through the top and bottom surfaces of the base rails and aligned with aligned bolt holes in the connecting members for receiving bolts therethrough.

According to a further preferred embodiment of the invention, the fore and aft fittings of the base rails are adapted to position the base rails in spaced-apart relation to the aircraft deck.

According to a further preferred embodiment of the invention, an aircraft passenger seat with a low-profile swivel assembly is provided and includes a pair of transversely spaced-apart base rails, each including fore and aft fittings for connecting the base rails to an aircraft deck. The base rails define a transversely-extending horizontal plane extending between them. A swivel assembly is mounted between the pair of base rails in the laterally-extending horizontal plane. A seat pan is mounted on the swivel assembly for rotational movement on a vertical axis defined by the swivel assembly, and a seat back is mounted on a rear side of the seat pan.

According to one preferred embodiment of the aircraft seat, the swivel assembly of the seat defines a transversely extending spar connected to and bridging the space between the base rails in the transversely-extending horizontal plane extending between the pair of base rails.

According to a further preferred embodiment of the aircraft seat, the swivel assembly includes a swivel plate having a generally annular recess and an exterior lock flange formed therein.

According to a further preferred embodiment of the aircraft seat, the transversely extending spar is integrally-formed with the swivel plate and provides direct transfer of seat loading to the base rails.

According to a further preferred embodiment of the aircraft seat, the transversely extending spar includes elongate connecting members for being positioned in complementary locking apertures formed in the base rails.

According to a further preferred embodiment of the aircraft seat, the locking apertures comprise bolt holes extending through the top and bottom surfaces of the base rails and aligned with aligned bolt holes in the connecting members for receiving bolts therethrough.

According to a further preferred embodiment of the aircraft seat, the fore and aft fittings of the base rails are adapted to position the base rails in spaced-apart relation to the aircraft deck."

According to a further preferred embodiment of the aircraft seat, a swivel assembly is mounted between the pair of base rails in the laterally-extending horizontal plane and a slide assembly is mounted on the swivel assembly for permitting side-to-side and fore-and-aft movement of the seat independent of the swivel assembly. A seat pan is mounted on the swivel assembly for rotational movement on a vertical axis defined by the swivel assembly and on at least one translational axis defined by the slide assembly. A seat back is mounted on a rear side of the seat pan.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DETAILED DESCRIPTION OF THE INVENTION

Figure 1:
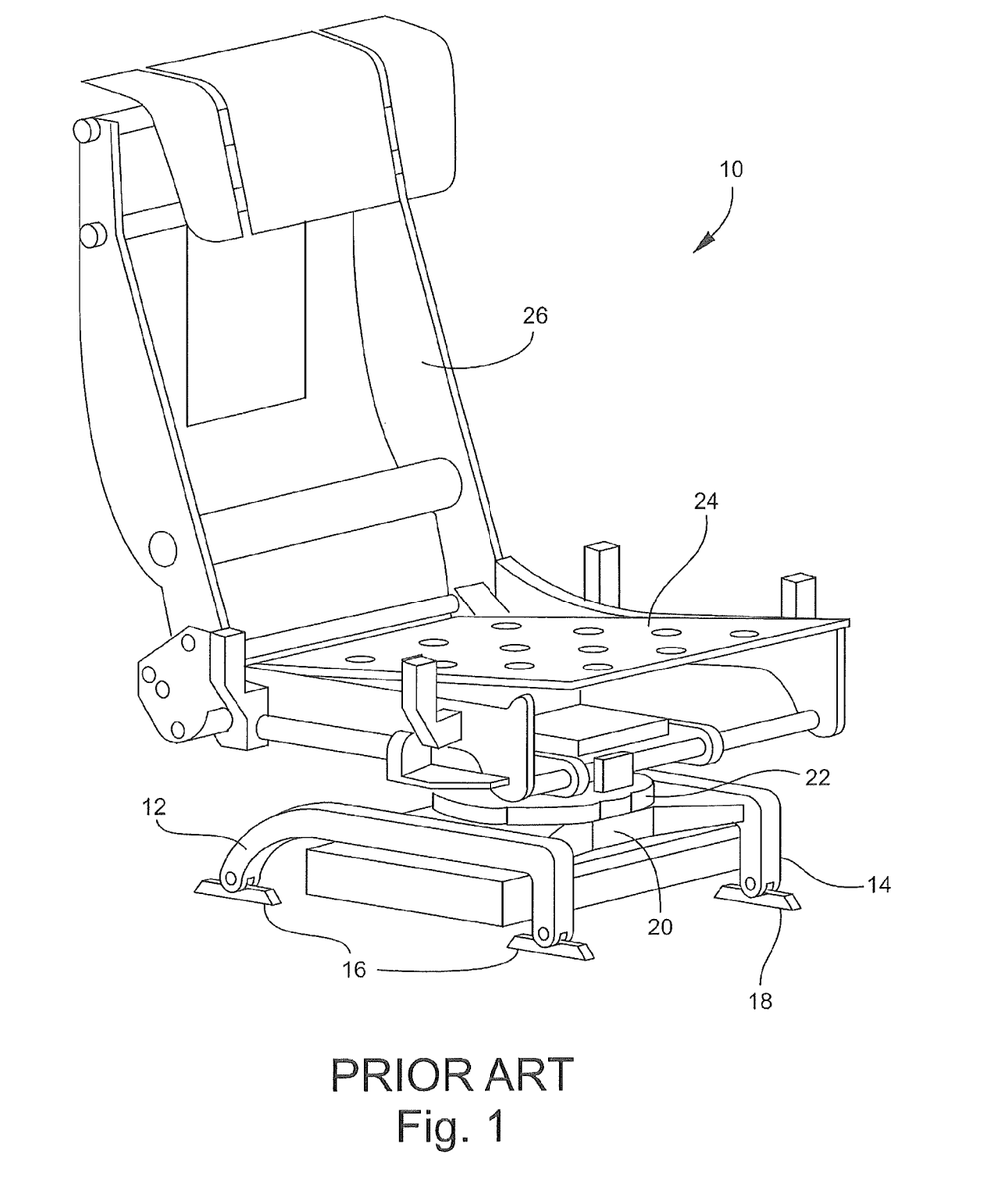
FIG. 1 is a perspective view of a typical prior art swiveling aircraft passenger seat.

Referring now to the drawings, a typical prior art swiveling aircraft passenger seat is illustrated in FIG. 1 and generally indicated at reference numeral 10. The prior art seat 10 includes a pair of base rails 12, 14 attached to an aircraft deck by track fittings 16, 18 that are locked into a seat track secured to the aircraft deck, not shown. A spar 20 extends transversely between the base rails 12, 14. A swivel assembly 22 is mounted to the top of the spar 20, and a seat pan assembly 24 is mounted to the top of the swivel assembly 22. A seat back assembly 26 is carried by the seat pan assembly 24. Suitable cushion members, not shown, are positioned in place on the seat pan assembly 24 and seat back assembly 26. As shown in FIG. 1, the swivel assembly 22 sits atop the spar 20 and thus adds the vertical dimension of the swivel assembly 22 to the overall height of the seat 10. Within the environment of a general aviation aircraft, even a few inches of additional seat height can significantly reduce passenger headroom, particularly in smaller general aviation aircraft that do not provide "stand up" room but require the passengers to stoop as they ingress and egress the aircraft. This reduced headroom is an important disadvantage not only while sitting, but can also impose further restraint and discomfort to a passenger when rising from or lowering into the seat.

Figure 2:
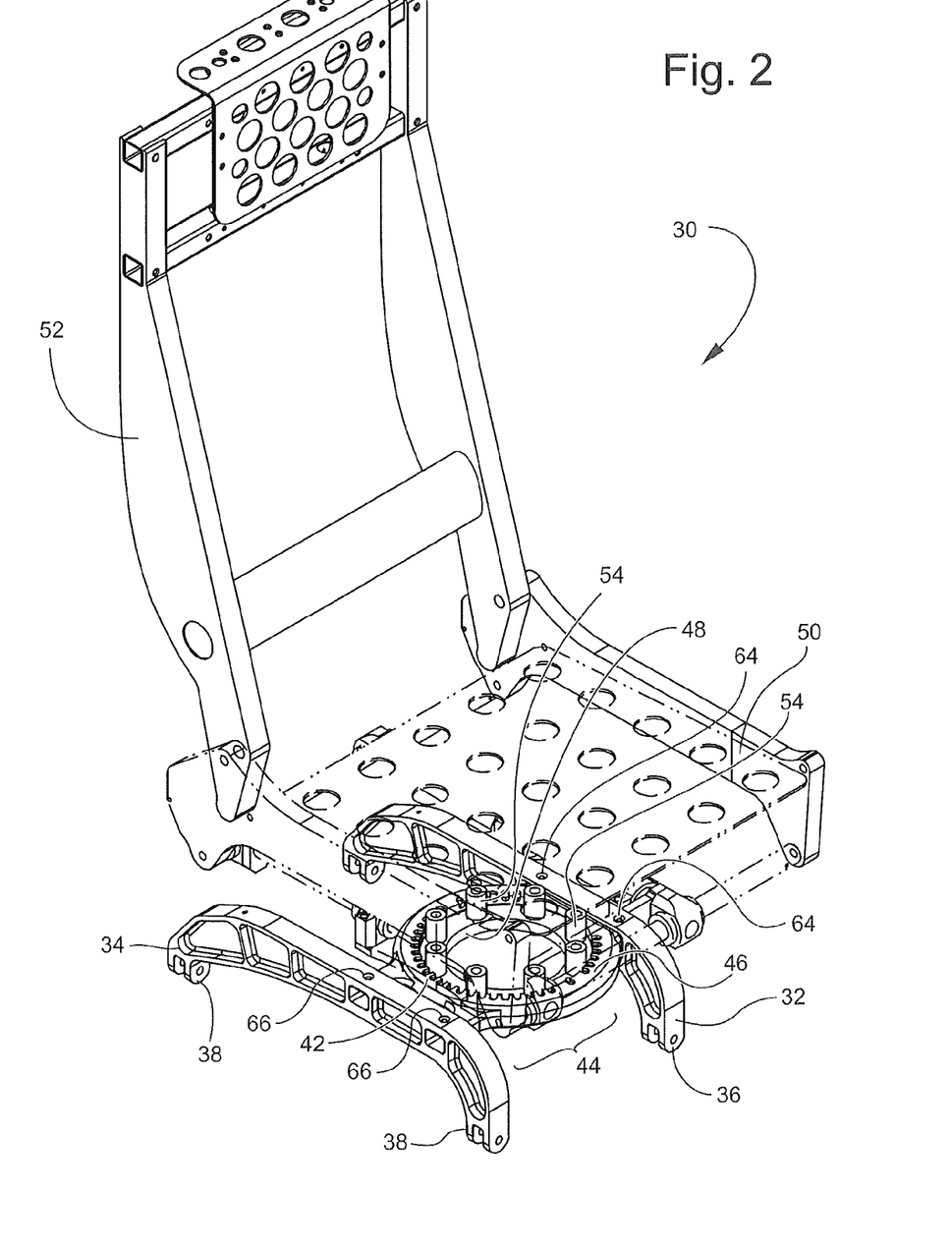
FIG. 2 is a perspective view of a swiveling aircraft passenger seat according to a preferred embodiment of the present invention.

Referring now to FIG. 2, an aircraft passenger seat 30 in accordance with the invention is illustrated and includes a pair of base rails 32, 34 that includes track fittings 36, 38 that lock the base rails 32, 34 into a seat track secured to the deck, not shown. A swivel assembly 40, which includes both a swivel mechanism 42 itself and a transversely-extending spar 44, is mounted between the base rails 32, 34 in the same horizontal plane as base rails 32, 34 and thus does not add to the overall height of the seat 30. As is best shown in FIG. 3, the swivel mechanism 42 is preferably integrally-formed with and forms the spar 44, otherwise known as a "sparvel."

The particular design of the swivel mechanism 42 may vary widely insofar as the specifics of operation are concerned. As shown in FIG. 3, the swivel mechanism 42 includes a stationary swivel plate 46 in which is mounted a rotatable swivel ring 48 that is mounted to the seat pan 50, as shown in FIG. 2.

Figure 3:
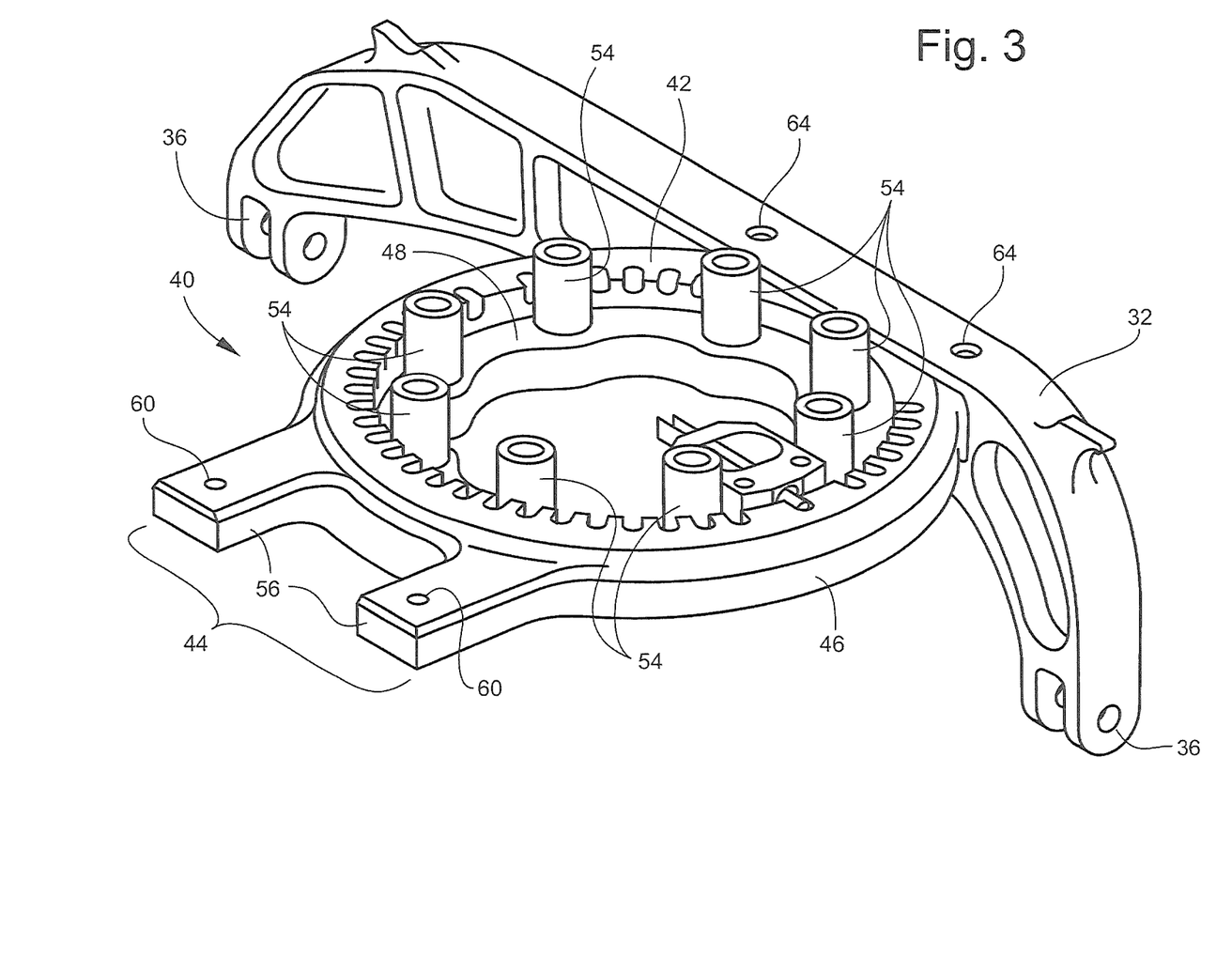
FIG. 3 is a partial perspective view of a seat base rail and attached swivel assembly according to an embodiment of the present invention.
Figure 4:
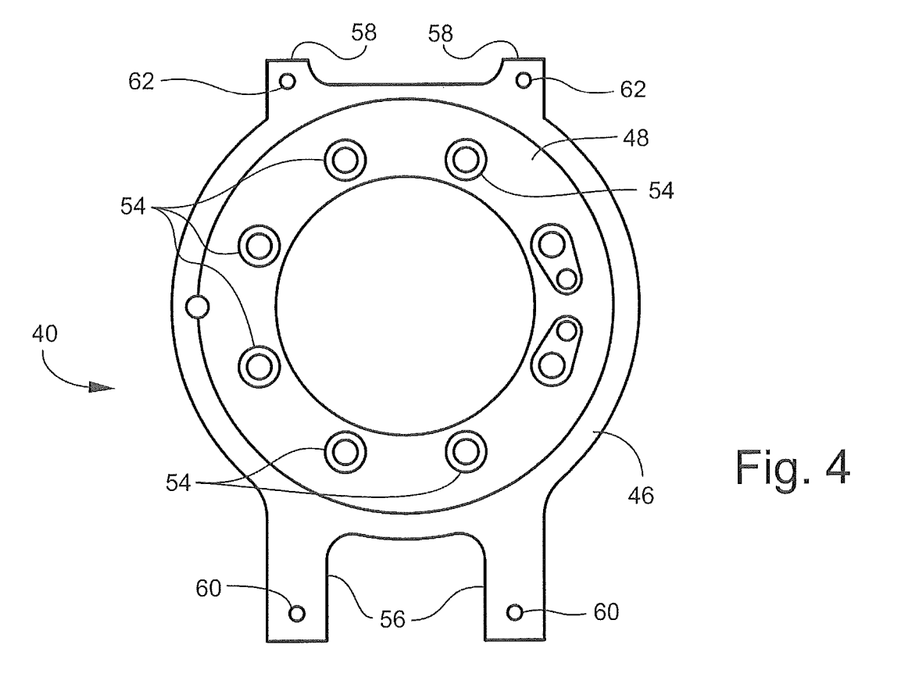
FIG. 4 is a top plan view of the swivel assembly.
Figure 5:
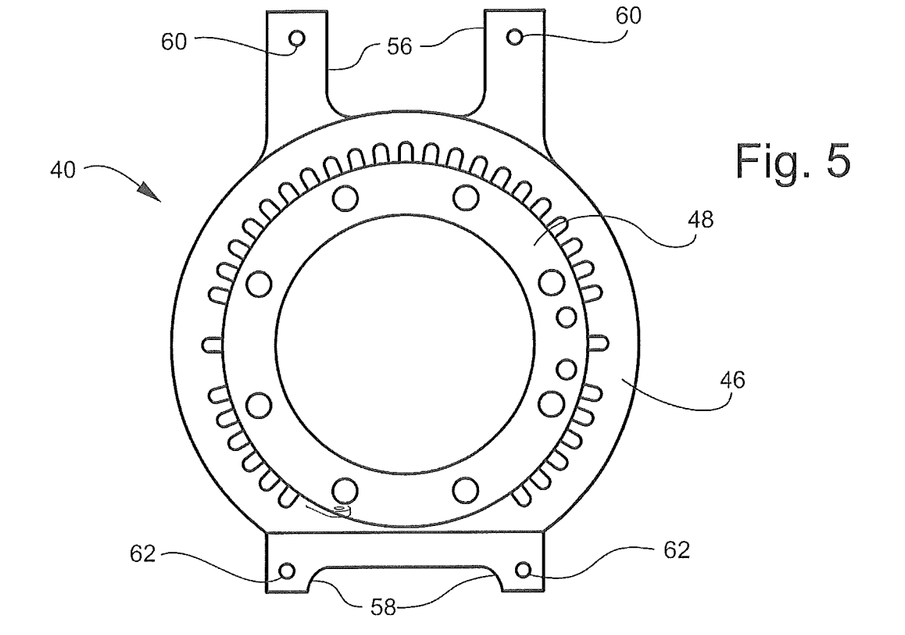
FIG. 5 is a bottom plan view of the swivel assembly shown in FIG. 4.
Figure 6:
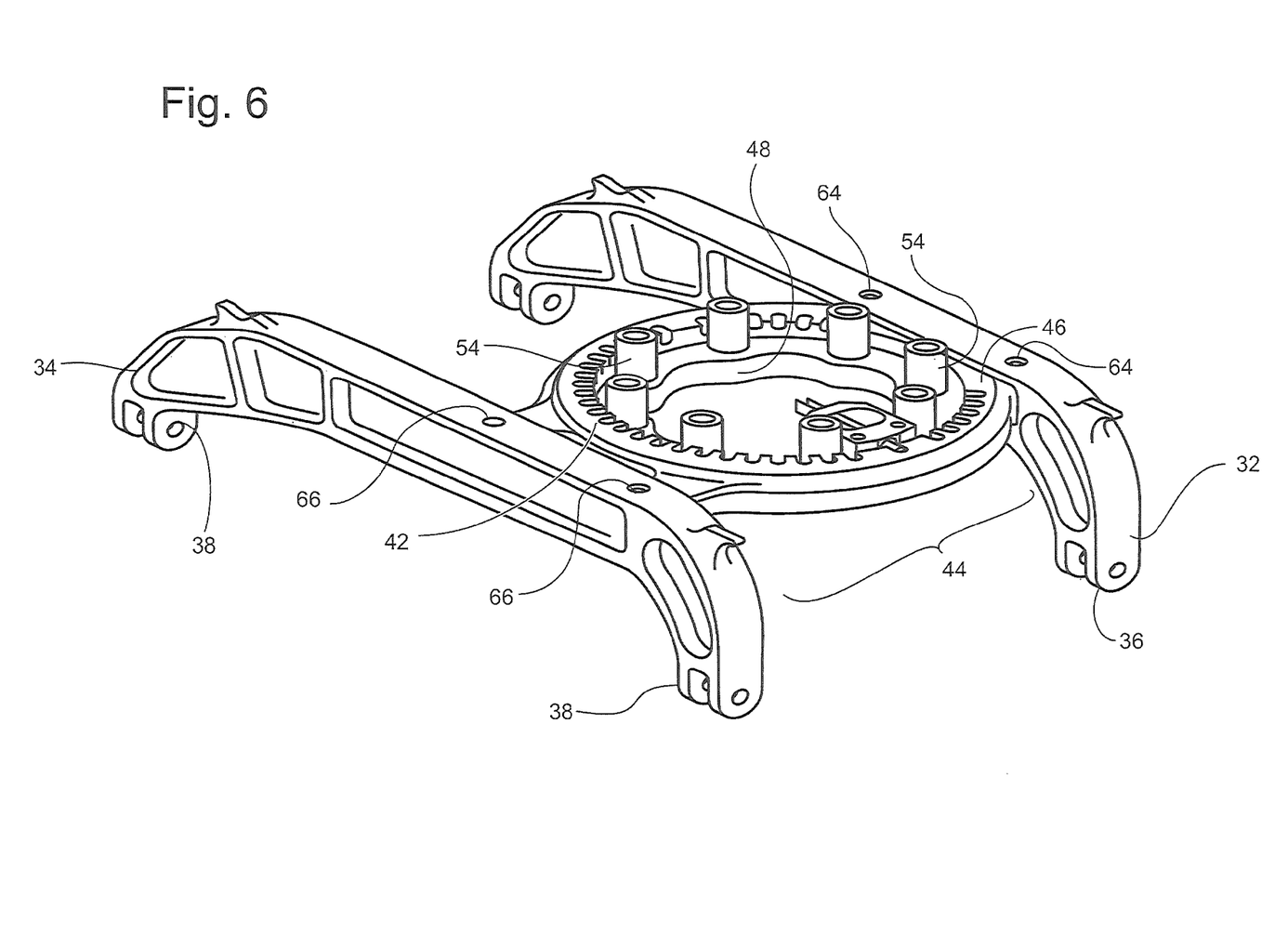
FIG. 6 is a perspective view of the seat base and attached swivel assembly.

As also shown in FIGS. 3, 4 and 5 swivel plate 46 includes integrally-formed connecting members 56, 58 by which the swivel assembly 40 is mounted to the base rails 32, 34. Bolt holes 60, 62 in connecting members 56, 58 are positioned in the swivel assembly 40 to align with locking apertures 64, 66 in the base rails 32, 34. The swivel assembly 40 thus becomes the spar 44, mounting the seat pan 50 and the attached seat back 52 to the base rails 32, 34 without adding height to the seat 30. The swivel 42 is attached to the seat pan 50 by a series of threaded bushings 54 extending upward from the rotatable swivel ring 48.

In addition, seat loading is transferred directly to the base rails 32, 34. Weight is reduced by combining the spar and swivel assembly into a single structure.

Figure 7:
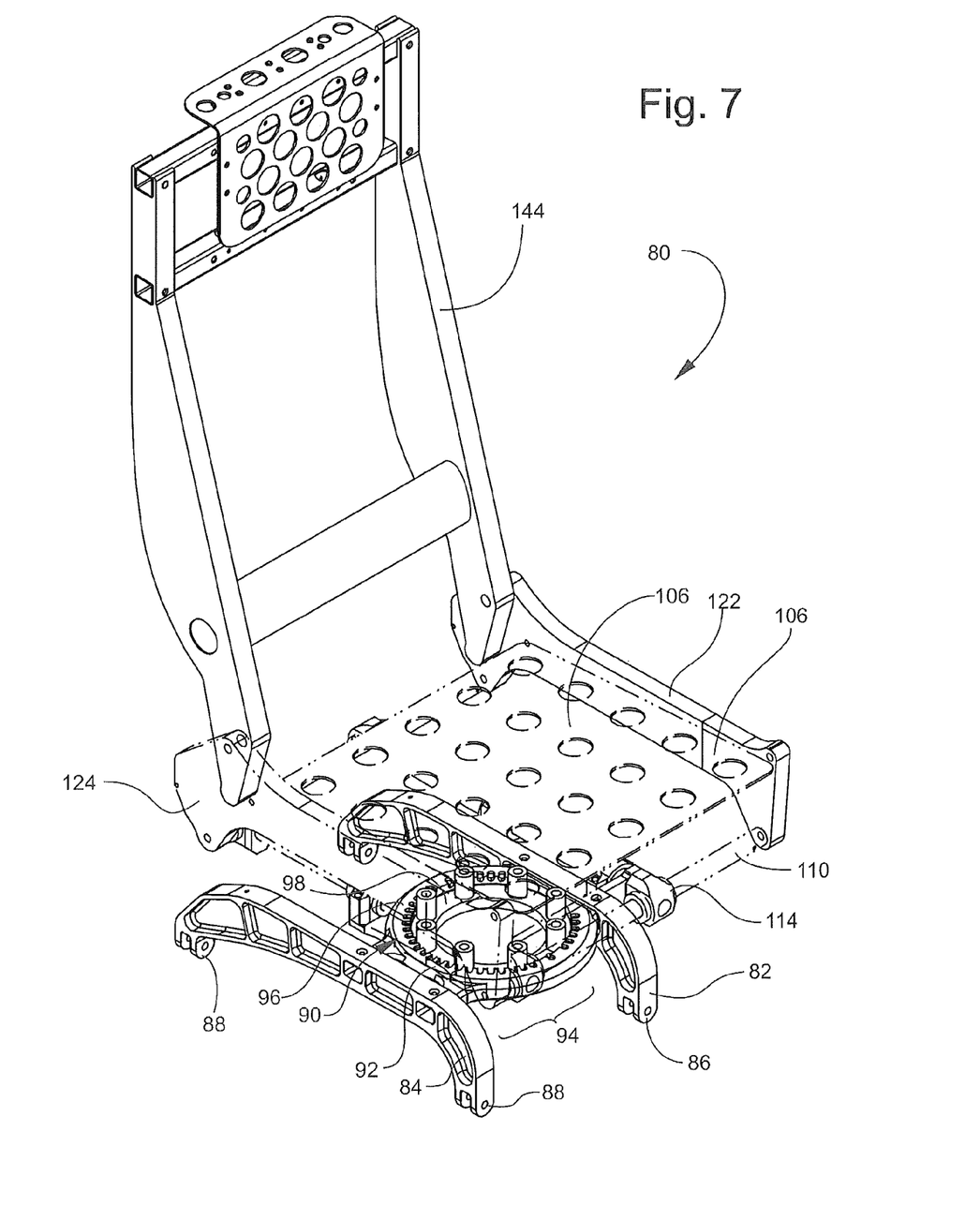
FIG. 7 is a perspective view with parts broken away illustrating an alternative preferred embodiment having a swivel, side-to-side and fore-and-aft seat motion available to the passenger.
Figure 8:
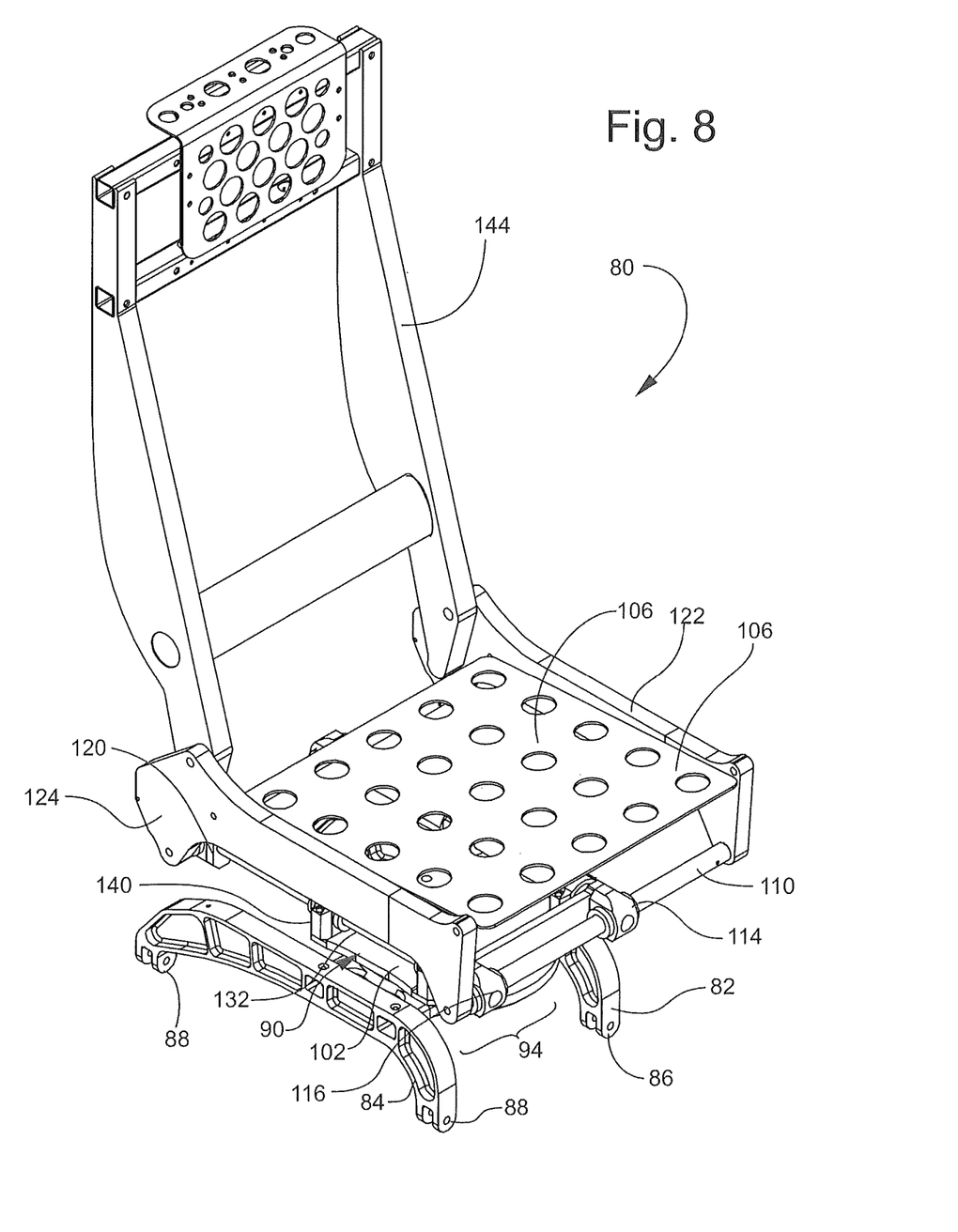
FIG. 8 is a perspective view similar to FIG. 7 but without parts broken away.
Figure 9:
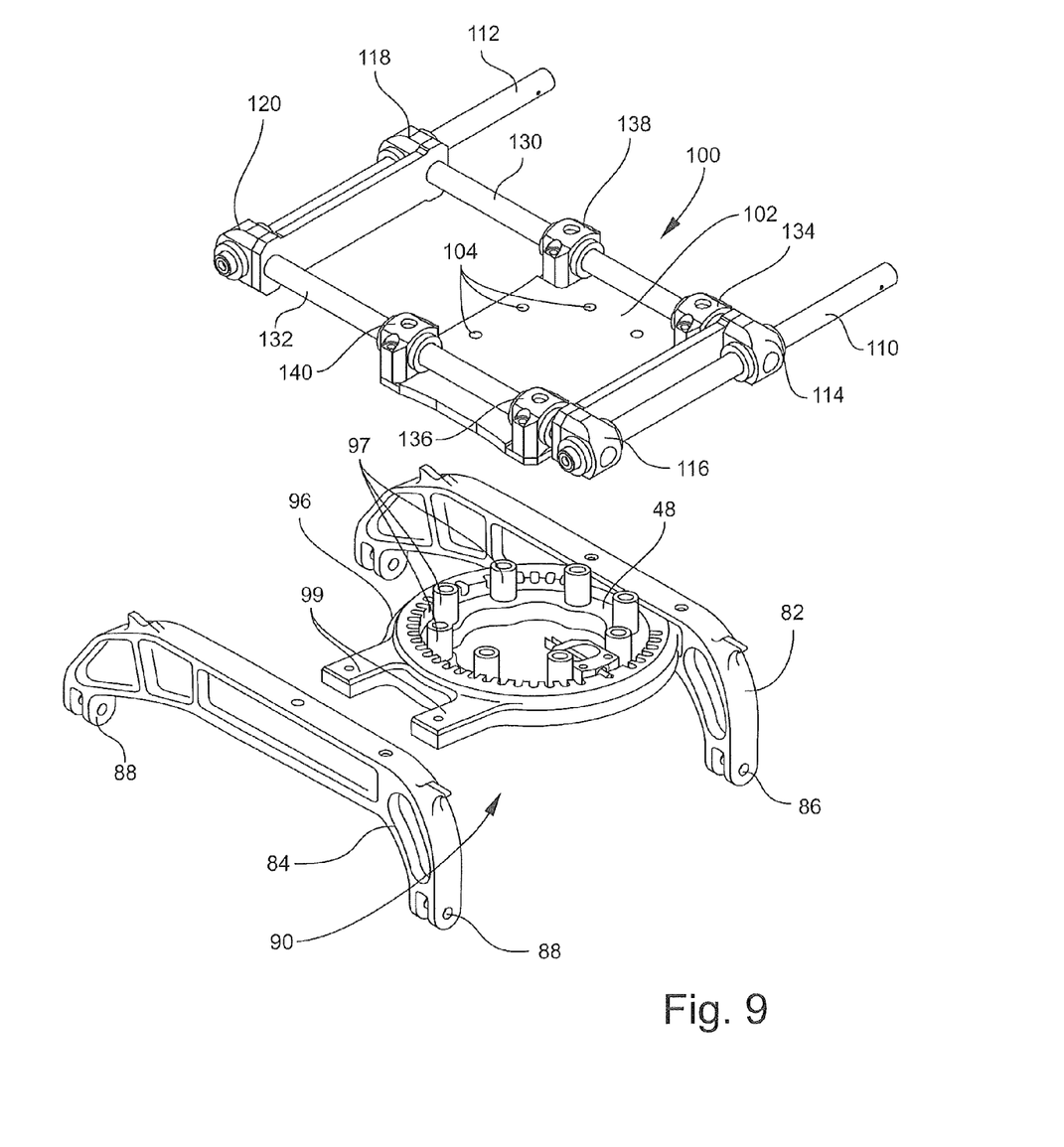
FIG. 9 is an exploded perspective view of the swivel and slide mechanisms of the seat shown in FIGS. 7 and 8.

Referring now to FIGS. 7-10, a passenger seat 80 is illustrated and includes in accordance with the invention is illustrated and includes a pair of base rails 82, 84 that includes track fittings 86, 88 that lock the base rails 82, 84 into a seat track secured to the deck, not shown. A swivel assembly 90, which includes both a swivel mechanism 92 itself and a transversely-extending spar 94, is mounted between the base rails 82, 84 in the same horizontal plane as base rails 82, 84 and thus does not add to the overall height of the seat 80. As is best shown in FIG. 9, the swivel mechanism 92 is preferably integrally-formed with and forms the spar 94, the unified structure otherwise known as a "sparvel."

Figure 10:
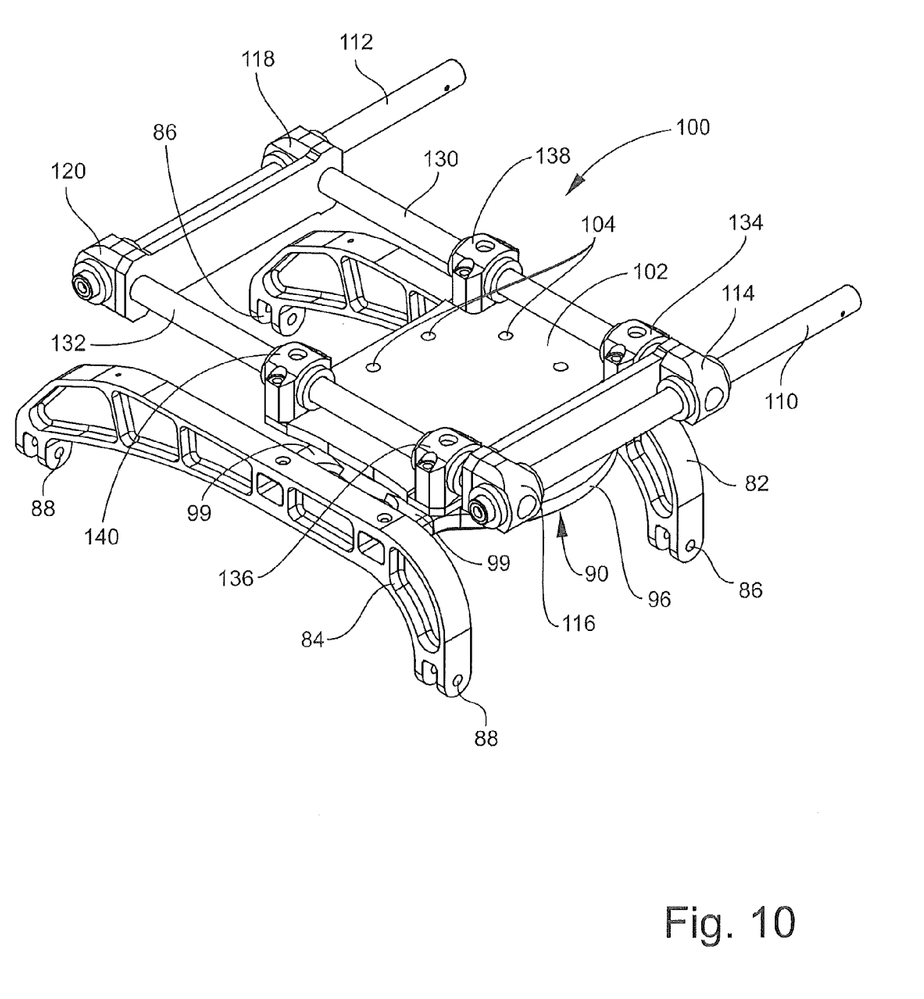
FIG. 10 is a perspective view of the swivel and slide mechanism shown in FIG. 9.

The particular design of the swivel mechanism 92 may vary widely insofar as the specifics of operation are concerned. As shown in FIG. 9, the swivel mechanism 92 includes a stationary swivel plate 96 in which is mounted a rotatable swivel ring 98 that is mounted to a slide assembly 100, also as shown in FIGS. 9 and 10. The swivel plate 96 includes integrally-formed connecting members 99 (see also elements 58 in FIGS. 4 and 5) by which the swivel assembly 90 is mounted to the base rails 82, 84.

The slide assembly 100 includes a slide plate 102 that is mounted to the swivel plate 96 by bolts, not shown, that extend through bolt holes 104 and mate with threaded bushings 97 in the rotatable swivel ring 98.

As is shown in FIGS. 7 and 8, a seat pan 106 is mounted to a first pair of slide tubes 110, 112 for side-to-side translating movement. The slide tubes 110, 112 are mounted in a first plurality of slide bushings 114, 116, 118, 120, and the seat pan 106 is mounted to the opposing ends of the slide tubes 110, 102. FIGS. 8 and 9 best show that the seat pan 106 includes side frames 122, 124 that extend along opposite sides and which are bolted to the opposing ends of the slide tubes 110, 112 by bolts that are threaded into the ends of the slide 110, 112.

The slide tubes 130, 132 are mounted in slide bushings 134, 136, 138, 140 for fore-and-aft sliding movement. In this manner the seat pan 106 and the attached seat back 144 is permitted to slide side-to-side and fore-and-aft within the range of motion provided by the length of the slide tubes 110, 112 and 130, 132, while simultaneously swiveling on the swivel assembly 90. This permits a seated passenger a wide range of seat adjustment during travel, as well as the ability to slide the seat 80 away from the fuselage and aft while swiveling and comfortably stand up and leave the seat. The placement of the swivel assembly 90 within the lateral plane of the base rails 82, 84 provides more headroom to the seated passenger without the need to reduce the height of the seat pan 106 above the aircraft deck. The slide assembly 100 has a very shallow profile and thus adds only slightly to the overall seat height. The lateral spacing of the base rails in both disclosed embodiments is controlled by the width of the seating tracks mounted in the aircraft deck. As is best shown in FIGS. 7 and 8, the width of the seat 80 may be significantly wider than the base rail spacing.

As noted from the above discussion, seats having only the disclosed swivel feature as well as seats having both a swivel feature and a sliding feature are within the scope of the invention, as are seats that slide only fore-and aft, as well as seats that slide only side-to-side or that slide in both fore-and aft and side-to-side directions.

Low profile, swiveling and/or sliding aircraft passenger seats and aircraft passenger seat swivel and/or slide assemblies are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An aircraft passenger seat swivel assembly for an aircraft seating unit, comprising:
    (a) first and second transversely spaced-apart base rails, wherein a top surface of the first base rail and a top surface of the second base rail are horizontally aligned and define a horizontal plane therebetween;
    (b) a swivel assembly mounted between the first and second base rails, the swivel assembly comprising a static swivel plate in which is mounted a rotatable swivel ring, the swivel plate having integrally formed first and second pairs of connecting members extending outwardly in opposite directions therefrom, the first pair of connecting members mounted against an underside of the first base rail and the second pair of connecting members mounted against an underside of the second base rail such that no portion of the swivel assembly extends above the horizontal plane, and the second pair of connecting members having a longer length than the first pair of connecting members such that the static swivel plate is positioned closer to the first base rail than to the second base rail; and
    (c) a plurality of vertically oriented bushings attached to the swivel ring and extending above the horizontal plane.

2. The aircraft passenger seat swivel assembly according to claim 1, wherein the first pair of connecting members are received in locking apertures formed in the first base rail and the second pair of connecting members are received in locking apertures formed in the second base rail.

3. The aircraft passenger seat swivel assembly according to claim 2, wherein the locking apertures comprise bolt holes extending through top and bottom surfaces of the first and second base rails which align with bolt holes defined through ends of the first and second pairs of connecting members.

* * * * *